(12) United States Patent
Vieth et al.

(10) Patent No.: US 7,772,150 B2
(45) Date of Patent: Aug. 10, 2010

(54) METHOD TO PREPARE NANOPARTICLES ON POROUS MEDIUMS

(75) Inventors: Gabriel M. Vieth, Knoxville, TN (US); Nancy J. Dudney, Oak Ridge, TN (US); Sheng Dai, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 514 days.

(21) Appl. No.: 11/742,652

(22) Filed: May 1, 2007

(65) Prior Publication Data

US 2008/0274344 A1 Nov. 6, 2008

(51) Int. Cl.
| | |
|---|---|
| B01J 20/00 | (2006.01) |
| B01J 23/02 | (2006.01) |
| B01J 23/40 | (2006.01) |
| B01J 23/42 | (2006.01) |
| B01J 23/70 | (2006.01) |
| B01J 37/00 | (2006.01) |
| C08F 4/60 | (2006.01) |
| C08K 9/02 | (2006.01) |
| C08J 3/00 | (2006.01) |
| C08K 3/08 | (2006.01) |
| H01B 1/22 | (2006.01) |

(52) U.S. Cl. .............. 502/326; 502/102; 502/344; 502/407; 502/414; 523/204; 523/340; 524/440

(58) Field of Classification Search ............ 502/102, 502/326, 407, 414, 344; 523/204, 340
See application file for complete search history.

(56) References Cited

U.S. PATENT DOCUMENTS

| | | | |
|---|---|---|---|
| 4,727,050 A * | 2/1988 | Tamblyn et al. | 502/159 |
| 6,603,038 B1 * | 8/2003 | Hagemeyer et al. | 560/241.1 |
| 6,824,689 B2 * | 11/2004 | Wang et al. | 210/660 |
| 7,011,760 B2 * | 3/2006 | Wang et al. | 210/660 |
| 7,547,347 B2 * | 6/2009 | Yang et al. | 75/351 |
| 7,550,520 B2 * | 6/2009 | Daly et al. | 523/300 |
| 7,597,936 B2 * | 10/2009 | Smith et al. | 427/419.1 |
| 2003/0019327 A1 | 1/2003 | Fujimoto | |
| 2003/0104936 A1 * | 6/2003 | Mao et al. | 502/339 |
| 2005/0080157 A1 | 4/2005 | Wagener et al. | |
| 2005/0126340 A1 | 6/2005 | Fujimoto | |
| 2005/0205860 A1 | 9/2005 | Hsu et al. | |
| 2005/0222333 A1 | 10/2005 | Hsu | |
| 2006/0269695 A1 * | 11/2006 | Daly et al. | 427/598 |
| 2007/0101824 A1 * | 5/2007 | Drzal et al. | 75/345 |
| 2008/0271570 A1 * | 11/2008 | Vieth et al. | 75/345 |
| 2008/0274344 A1 * | 11/2008 | Vieth et al. | 428/304.4 |
| 2009/0197760 A1 * | 8/2009 | Dupont et al. | 502/62 |

OTHER PUBLICATIONS

Gledison, S.F., Umpierre, A.P., Fichtner, P.F.P., Teixeira, S.R., Dupont, J. "The Use of Imidazolium Ionic Liquids for the Formation and Stabilization of Ir0 and Rh0 Nanoparticles: Efficient Catalysts for the hydrogenation of Arenes." Chem. Eur. J., vol. 9, p. 3263-3269, 2003.*

Huang, J., Jiang, T., Gao, H., Han, B., Liu, Z., Wu, W., Chang, Y., Zhao, G. "Pd Nanoparticles Immobilized on Molecular Sieves by Ionic Liquids: Heterogeneous Catalysts for Solvent-Free Hydrogenation." Angew. Chem., vol. 116, p. 1421-1423, 2004.*

Miao, S., Liu, Z., Han, B., Huang, J., Sun, Z., Zhang, J. Jiang, T. Angew. Chem. vol. 118, p. 272, online Nov. 28, 2005.*

Zhao, Z.W., Guo, Z.P., Ding, J. Wexler, D., Ma, Z.F., Zhang, D.Y., Liu, H.K. Electrochemistry Communications, vol. 8, p. 248, online Dec. 22, 2005.*

Weiping et al., Characterization and the optical switching phenomenon of porous silica dispersed with silver nanoparticles within its pores, J. Phys. Condens. Matter, 8 (1996), pp. 591-596.

Wasserscheid et al., Ionic Liquids-New "Solutions" for Transition Metal Catalysts, Angew. Chem. Int. Ed., 39 (2000), pp. 3773-3789.

Huddleston et al., Characterization and comparison of hydrophilic and hydrophobic room temperature ionic liquids incorporating the imidzolium cation, Green Chem., 3 (2001), pp. 156-164.

Kovalenko et al., Porous Silica Films as a Support of Ultrafine Metal Particles and Clusters, Int'l Conf. on Sol Gel Materials, Jun. 13-16, 2001, Wroclaw-Rokosowo, Poland.

Morley et al., Clean preparation of nanoparticulate metals in porous supports: a supercritical route, J. Mater. Chem., 12 (2002), pp. 1898-1905.

Antonietti et al., Ionic Liquids for the Convenient Synthesis of Functional Nanoparticles and Other Inorganic Nanostructures, Angew. Chem. Int. Ed., 43 (2004), pp. 4988-4992.

Fredlake et al., Thermophysical Properties of Imidazolium-Based Ionic Liquids, J. Chem. Eng. Data, 49 (2004), pp. 954-964.

Liu et al., Microwave-Assisted Synthesis of Pt Nanocrystals and Deposition on Carbon Nanotubes in Ionic Liquids, J. of Nanoscience & Nanotechnology, 6 (2006), pp. 175-179.

Torimoto et al., Sputter deposition onto ionic liquids: Simple and clean synthesis of highly dispersed ultrafine metal nanoparticles, Applied Physics Letters, 89, 243117 (2006), pp. 1-3.

* cited by examiner

*Primary Examiner*—Vasu Jagannathan
*Assistant Examiner*—Anthony H Sheh
(74) *Attorney, Agent, or Firm*—Novak Druce + Quigg LLP; Gregory A. Nelson; Gregory M. Lefkowitz

(57) ABSTRACT

A method to prepare porous medium decorated with nanoparticles involves contacting a suspension of nanoparticles in an ionic liquid with a porous medium such that the particles diffuse into the pores of the medium followed by heating the resulting composition to a temperature equal to or greater than the thermal decomposition temperature of the ionic liquid resulting in the removal of the liquid portion of the suspension. The nanoparticles can be a metal, an alloy, or a metal compound. The resulting compositions can be used as catalysts, sensors, or separators.

15 Claims, No Drawings

METHOD TO PREPARE NANOPARTICLES ON POROUS MEDIUMS

STATEMENT REGARDING FEDERALLY SPONSORED RESEARCH OR DEVELOPMENT

The present invention developed under contract No. DE-AC05-00OR22725 with the U.S. Department of Energy. The U.S. government has certain rights in the invention.

CROSS-REFERENCE TO RELATED APPLICATIONS

Not applicable.

FIELD OF THE INVENTION

The invention pertains to porous media with nanoparticles dispersed through the pores.

BACKGROUND OF THE INVENTION

Metals supported on porous media are important for use as sensors, separators or supported catalysts. Such supported catalysts can be used for chemical transformations such as hydrogenations. These supported catalysts can be used in continuous flow systems or batch reactions and permit the recovery and recycling of the catalysts, which are often very expensive and frequently difficult to remove when not associated with the supporting media. Common supporting porous media are carbon, silica, alumina, and organic polymers. Often organic polymers are incompatible with the solvents or temperatures used under the reaction conditions and there use is generally more limited in scope relative to that of carbon and inorganic oxides.

Fabrication of porous supporting media loaded with metal or other particles is difficult. The porous medium is frequently grown around the particles. Examples of the growth of the medium around the particles are the hydrolysis and condensation of a tetralkyloxysilane about dispersed particles to yield a porous silica containing dissimilar particles and the dispersion of particles in an organic polymer solution followed by removal of the solvent and pyrolysis of the polymer in an inert atmosphere to form a carbon foam with dispersed particulates. Although the size of the particle is readily controlled in this manner, these particles can be encapsulated by the support such that many or all particles are not available at the surface of the pores where they are needed for their effective use as a catalyst.

An alternative approach to the formation of a porous media around preformed particles is the formation of particles from a fluid precursor infused into a porous media. For example, the porous media can be put in contact with a soluble metal salt solution which can then be transformed into metal particles, often by a series of oxidation and reduction reactions to precipitate a metal oxide in the pores of the media followed by reduction of the oxides to metal particles.

The infusion of the metal into a porous media can be carried out by vapor deposition of a metal onto and into the media. Under well controlled conditions discreet metal islands can be formed on the media with a continuous metal film resulting upon further deposition, limiting the surface area of the metal to no more than the surface area of the porous medium and hence defining the maximum effectiveness of the structure as a catalyst. As the metal is deposited in intimate contact with the surface of the porous medium a large proportion of the metal surface is not available as a catalyst.

The infusion of preformed particles into porous media has been problematic. The infusion of single particles dispersed in a liquid medium requires that the particle is stabilized as agglomeration of the small particles or the coalescence of the small particles into a large particle can inhibits the filing of the pores of the media. Additionally coalescence or aggregation can reduce the effective surface area of the particles and hence their performance for a desired application. Additives and other surfactants and other stabilizers can be used to inhibit the aggregation of the particles, however, the removal of the additive is often difficult yet frequently required to provide a highly desired active surface for catalysis and other applications.

Hence a method that readily generates a porous medium with nanoparticles decorating the surface of the pores in a manner where virtually all particles can contribute to the activity of the catalyst, sensor, or other application remains a need.

SUMMARY OF THE INVENTION

A method for preparing a porous medium decorated with nanoparticles includes the steps of providing a suspension of nanoparticles in a liquid including at least one ionic liquid, contacting a porous medium with the suspension at a temperature where the ionic liquids are stable and fluid, and removing the liquid. The nanoparticles can be a metal, a metal alloy or a metal compound. A variety of metals can be used including, but not limited to, platinum, silver, gold, cobalt, nickel, iron, manganese, rhodium, palladium, rhenium, ruthenium, iridium or osmium. The nanoparticles can be from about 1 to about 20 nm in diameter. The ionic liquid can be the combination of cations selected from the group consisting of 1-alkyl-3-methylimidizolium, N-alkyl pyridinium, mono-, di-, tri- or tetraalkyl ammonium, and mono-, di-, tri- or tetraalkylphosphonium and anions selected from the group consisting of $Cl^-$, $Br^-$, $I^-$, $NO_3^-$, $BF_4^-$, $PF_6^-$, $CF_3CO_2^-$, $CF_3SO_3^-$, $(CF_3SO_2)_2N^-$, $CH_3(CH_2)_xCO_2^-$ where x=0 to 18, and $BR_4^-$ where R=independently $C_1$ to $C_8$ alkyl. The nanoparticle suspension can be of metal nanoparticles formed by a physical vapor deposition process wherein the suspension is substantially free of surfactants, chemical reagents or chemical by-products. The porous medium can be electrically conducting, semiconducting or insulating. The porous medium can be graphite foam, mesoporous silica, porous alumina, aerogels or xerogels. The porous medium can be a porous polymeric resin, plastic or rubber. The porous medium can be a porous metal or metal alloy. The step of removing can be carried out under nitrogen or a noble gas. The step of removing can be carried out under a pressure lower than 1 atmosphere. The liquid can include an organic solvent. The method can include repeating the steps of contacting and removing until a desired loading of the nanoparticles on the medium is achieved. The removing step can be performed by heating the liquid to a temperature in excess of the decomposition temperature of the ionic liquid at a pressure at which the decomposition products are volatile.

A porous nanoparticle decorated medium is produced from a method that includes the steps of providing a suspension of nanoparticles in a liquid including at least one ionic liquid, contacting a porous medium with the suspension at a temperature where the ionic liquid is stable and the liquid is fluid, and removing the liquid. A preferred decorated medium results when the suspension of nanoparticle used in the method is substantially free of surfactants, chemical reagents or chemical by-products to yield a decorated medium is substantially free of residual surfactants, chemical reagents or chemical by-products. The nanoparticles can be a metal, a metal alloy or a metal compound. The average size of the nanoparticles can be from about 1 to about 20 nm. The porous medium can be graphite foam, mesoporous silica, porous alumina, an aerogel, a xerogel, a porous metal, a metal alloy, or a porous polymeric resin, plastic, or rubber.

DETAILED DESCRIPTION OF THE INVENTION

A porous medium decorated with nanoparticles can be prepared by a method where a suspension comprising nanoparticles in an ionic liquid is diffused into the porous medium followed by the subsequent removal of the ionic liquid in a manner that leaves the nanoparticles deposited on the surfaces of the medium external and internal to the pores. As used herein the phrase "decorated with nanoparticles" is defined to mean that the nanoparticles reside on external surfaces and the surfaces of the pores. The porous medium decorated with nanoparticles can be used as catalysts, sensors, separators or any other application where a porous medium coated with nanoparticles is desired. It is preferable that the suspension used in this method is exclusively or primarily the nanoparticles in an ionic liquid. However, other solvents, additives, surfactants, stabilizers and reaction byproducts may be present in the suspension without departing from the goal and intent of the invention and may be desirable for modification of affinities and activities of the resulting porous medium decorated with nanoparticles or to modify the process by modifying the properties of the liquid suspensions such as surface tension, hydrophilicity, viscosity, or other properties needed for use with a specific porous medium. Examples of solvents that can be used include any organic liquid that is miscible with the ionic liquid. The solvent can be added to the suspension of the nanoparticle in the ionic liquid to dilute the nanoparticle suspension. The removal of the ionic liquid to yield the porous medium decorated with nanoparticles can comprise thermolysis of the ionic liquid to volatile species.

The porous medium can be electrically conducting, semiconducting or insulating. Preferred porous media that can be used include graphite foam, mesoporous silica, porous alumina, aerogels and xerogels. Other media such as porous polymeric resins, plastics, and rubbers can be used although the nature of the appropriate ionic liquids, other components, processing temperatures, and other conditions will typically be more restrictive for the practice of the technology to assure that the structure of the medium is not altered or is altered in a desired fashion while performing the method. The porous media can be a porous metal or metal alloy. The porous medium can be in the form of particles, beads, films, sheets, blocks, etc. with any size and shape.

Nanoparticles are sufficiently small to enter most pores of common porous media permitting an effective coverage of all or nearly all of the surface area of the porous medium with nanoparticles. Furthermore, as the nanoparticles can be used to promote surface catalyzed chemical transformations, the efficiency and rate of the transformation can be dramatically enhanced by the enormous surface area provided by nanoparticles for any given mass of particles. For example, the surface area of 5 nm spherical particles is 200 times the surface area of 1 μm spherical particles of the same mass of any given composition. The nanoparticle can be a metal, an alloy of two or more metals, or a metal compound. Included among the metal compounds that can comprise the nanoparticles can be metal oxides, metal nitrides, metal sulfides, metal carbides, metal oxynitrides or metal oxysulfides. It is preferable to have nanoparticles with a diameter of about 1 to about 100 nm. It is more preferable to have nanoparticles with a diameter of 20 nm or less. It is most preferable to have nanoparticles with a diameter of 10 nm or less. The size of the nanoparticle used depends on the diameter of the pores of the medium. The nanoparticle must be smaller than the average pore's minimal cross-section and preferably is no more than half the minimal cross-section of the pores. For example, a medium with 100 nm pores would best accommodate nanoparticles of 50 nm or less. In general the pores of the medium are around 5 nm or greater in diameter and can be up to 100 μm or greater. Preferably the nanoparticle is a metal. Any solid metal can be used, such as platinum, silver, gold, cobalt, nickel, iron, manganese, rhodium, palladium, rhenium, ruthenium, iridium and osmium.

Ionic liquids enable the inventive method due to special properties of these liquids. Ionic liquids are liquid that contains essentially only ions. As used in this invention the ionic liquids is defined as a salt whose melting point is below 100° C. including salts that are fluid at normal room temperatures commonly referred to as room temperature ionic liquids.

One property of ionic liquids is that they display little or no vapor pressure below their decomposition temperature. This permits the preparation of the suspension by the physical vapor deposition of the metal particles into the ionic liquid as nanoparticles. Physical vapor deposition processes that can be used include vacuum evaporation, pulsed laser deposition, and sputtering. The size of the nanoparticles formed can be selected and controlled by the composition of the ionic liquid or mixture of ionic liquids that is used. This preferred manner of producing the nanoparticle suspensions via physical vapor deposition avoids the inclusion of reaction by-products resulting during the formation of the metallic nanoparticles from a metal salt or metal complex precursor and a complimentary reactant when the nanoparticles are formed by a chemical reaction in the ionic liquid. The lack of the vapor pressure also ensures that the suspension does not change in composition or physical state during the diffusion process due to the loss of volatiles. This lack of vapor pressure tends to promote a consistent product over a relatively large range of temperatures and exposed surface area which permits performance of the method over a rather large processing window and with a variety of contacting techniques. For example, the processing window can include a relatively wide range of temperatures requiring only that the temperature is sufficiently high for the suspension to display a desired viscosity and sufficiently low to avoid decomposition of the ionic liquid. Because volatiles can be avoided, the contacting of the porous medium can give essentially the same or similar products when contacting is performed via dropping, spraying, or brushing the suspension onto the porous medium or by dipping the porous medium into the suspension. The pores can be filled primarily by capillary action. In addition to or in place of capillary action, other driving forces, such as the imposition of a pressure differential by the addition or removal of a gas from a chamber, can be used during the contact of the suspension with the medium.

Another feature of ionic liquids exploited for use in the inventive method is that ionic liquids can stabilize suspensions of metal particle without a surfactant or other stabilizer to avoid agglomeration or coalescence of the nanoparticles. Agglomeration and coalescence of the nanoparticles into larger particles can adversely affect the diffusion process of the nanoparticles into the porous medium and the effective surface area per mass of the nanoparticles decorating the porous medium. By stabilizing individual particles, suspensions can be prepared where the average particle size and the distribution of particles sizes can be such that virtually all particles are of a size smaller than the pores of the medium. In this manner, entry of nanoparticles into all or nearly all pores is possible, optimizing the surface area of metal nanoparticles in the resulting porous medium decorated with metal nanoparticles.

A significant feature of ionic liquids is the ability to decompose the ionic liquid thermally. Ionic liquids often display an onset of decomposition that is not significantly higher than a temperature where catastrophic decomposition occurs. The decomposition generally occurs by reaction of the anion and cation components of the ionic liquid. Depending upon the structure of the ionic liquids the decomposition can occur via a substitution reaction, an elimination reaction, or any other disproportionation reaction to yield neutral compounds. By selecting the pressure under which the thermal decomposition is carried out, the ionic liquid can be rapidly remove as volatile neutral species. Although the pressure under which decomposition and removal of the ionic liquid can be carried out can range from a high vacuum to a pressure in excess of one atmosphere, it is preferred that the decomposition and removal is performed at pressures that are about one atmosphere, or less. When the removal is sufficiently rapid, the resulting metal nanoparticles are not only free of the suspending ionic liquid and its volatile reaction byproducts, but also can display little if any coalescence into larger particles or aggregation of particles which would lower the effective surface area of the metal surface in the resulting porous medium decorated with metal nanoparticles. Little coalescence can be considered any increase in particle size of less than 10 times the size of the infused particle. The thermal decomposition is carried out at a temperature that is below the temperature where the metal melts or readily fuses and coalesces into fewer larger particles. Moreover, the ionic liquid is generally chosen to display a decomposition temperature below any melting or decomposition temperature of the porous medium. For graphite foam, mesoporous silica, porous alumina, aerogels and xerogels, the preferred porous media, virtually any ionic liquid can be used to practice the invention, as the media are stable at temperatures in excess of the decomposition temperature of common ionic liquids. For polymeric media the temperature of decomposition must be below the temperature at which the support can be altered by melting or decomposition of the medium. The thermal decomposition can be carried out under a non-oxidizing atmosphere, such as nitrogen or a noble gas such as argon to avoid the oxidation of the metal nanoparticles, the ionic liquid degradation products, the ionic liquid, other components of the suspension, or a polymeric support. When the medium, the metal, the ionic liquid, and its degradation products are not readily oxidized, the decomposition can be carried out in an oxidizing environment, such as air or other oxygen containing gas.

The amount of metal nanoparticles deposited in the porous medium can be controlled by the concentration of particles in the suspension. The method can be repeated such that a plurality of contacting and thermal decomposition steps are carried out until the desired loading level is achieved. The size of the nanoparticle can be controlled by the ionic liquid used. For example, by sputtering gold Au nanoparticles in 1-ethyl-3-methylimidazolium tetrafluoroborate particles with an average diameter ($d_{av}$) of 5.5 nm with a standard deviation ($\sigma$) of 0.86 nm can result, while the sputter deposition onto N,N,N-trimethyl-N-propylammonium bis(trifluoromethanesulfonyl)imide can result in the formation of much smaller Au nanoparticles with $d_{av}$ of 1.9 nm and a of 0.46 nm. Prolongation of the sputtering time results in a higher concentration of Au nanoparticles in the ionic liquid suspension, but does not cause a remarkable change in their size.

The ionic liquid is generally chosen to have a decomposition temperature that is sufficiently high, being at least 20° C. greater than the temperature at which the suspension is prepared and the porous medium is contacted, such that the decomposition occurs only after the nanoparticles have diffused into the pores of the medium. Ionic liquids include, as shown below, those cation structures of: 1-alkyl-3-methylimidizolium (I); N-alkyl pyridinium (II); mono-, di-, tri- or tetraalkyl ammonium (III); or mono-, di-, tri- or tetraalkylphosphonium (IV). The anion structure can vary and can include $Cl^-$, $Br^-$, $I^-$, $NO_3^-$, $BF_4^-$, $PF_6^-$, $CF_3CO_2^-$, $CF_3SO_3^-$, $(CF_3SO_2)_2N^-$, $CH_3(CH_2)_nCO_2^-$ where x=0 to 18, or $BR_4^-$ where R=independently $C_1$ to $C_8$ alkyl.

where R=$C_1$ to $C_8$ alkyl

where R=$C_1$ to $C_8$ alkyl

where R=independently H, $C_1$ to $C_8$ alkyl and where at least one R≠H

where R=independently H, $C_1$ to $C_8$ alkyl and at least one R≠H

EXAMPLES

It should be understood that the Examples described below are provided for illustrative purposes only and do not in any way define the scope of the invention.

Example 1

Platinum nanoparticles of an average diameter of 1 nm suspended at 0.47 weight percent in the ionic liquid 1-butyl-3-methylimidazolium bis-(trifluoromethanesulfonyl)-imide. Platinum was sputtered from a high purity (99.99+%) target into the ionic liquid in a stainless steel beaker rotated at a 45 degree angle containing a polytetrafluoroethylene coated stirring bar which tumbled to agitate the liquid using a 2" magnetron sputtering source and an argon plasma. The suspension was then added dropwise to make contact with a carbon foam at room temperature to fill the pores by capillary action. After contacting the foam with the suspension, the wetted foam was heated to 600° C. in flowing argon gas resulting in the decomposition of the ionic liquid to yield dry carbon foam decorated with Pt nanoparticles. The sample was analyzed by powder x-ray diffraction and showed the presence of Pt nanoparticles evidenced by the platinum peak widths, where an analysis using the Debye-Sherrer equation indicated an average diameter of 4.5 nm for the particles decorating the carbon foam.

The Pt nanoparticle decorated carbon foam was found to catalyze the decomposition of methanol to carbon dioxide and water at room temperatures. The reactor was purged with argon and then filled with 20% oxygen in argon and the foam was placed in a reactor with a vial of liquid methanol. The evolution of carbon dioxide was followed by FTIR spectroscopy.

It is to be understood that while the invention has been described in conjunction with the preferred specific embodiments thereof, that the foregoing description as well as the examples, which followed are intended to illustrate and not limit the scope of the invention. Other aspects, advantages and modifications within the scope of the invention will be apparent to those skilled in the art to which the invention pertains.

We claim:

1. A method for preparing a porous medium decorated with nanoparticles comprising the steps of:
    providing a suspension of nanoparticles in a liquid comprising at least one ionic liquid;
    contacting a porous medium with said suspension at a temperature where said ionic liquid is stable and said liquid is fluid; and
    removing said liquid, wherein the removing step comprises heating said liquid to a temperature in excess of the decomposition temperature of the ionic liquid at a pressure at which the decomposition products are volatile, and wherein nanoparticles decorated on said porous medium are free of the at least one ionic liquid and volatile reaction byproducts of the at least one ionic liquid.

2. The method of claim 1, wherein said nanoparticles comprise a metal, a metal alloy or a metal compound.

3. The method of claim 2, wherein said metal comprises platinum, silver, gold, cobalt, nickel, iron, manganese, rhodium, palladium, rhenium, ruthenium, iridium or osmium.

4. The method of claim 1, wherein an average size of said nanoparticles is from about 1 to about 20 nm.

5. The method of claim 1, wherein said ionic liquid comprises:
    cations selected from the group consisting of:
    1-alkyl-3-methylimidizolium

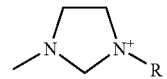

where R=$C_1$ to $C_8$, alkyl,
N-alkyl pyridinium

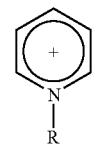

where R=$C_1$ to $C_8$, alkyl,
mono-, di-, tri- or tetraalkyl ammonium

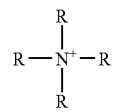

where R=independently H, $C_1$ to $C_8$ alkyl, where at least one R≠H, and
mono-, di-, tri- or tetraalkylphosphonium

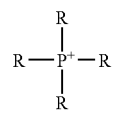

where R=independently H, $C_1$ to $C_8$ alkyl and at least one R≠H; and
anions selected from the group consisting of $Cl^-$, $Br^-$, $I^-$, $NO_3^-$, $BF_4^-$, $PF_6^-$, $CF_3CO_2^-$, $CF_3SO_3^-$, $(CF_3SO_2)_2N^-$, $CH_3(CH_2)_xCO_2^-$ where x=0 to 18, and $BR_4^-$ where R=independently $C_1$ to $C_8$ alkyl.

6. The method of claim 1, wherein said suspension is substantially free of surfactants, chemical reagents or chemical by-products.

7. The method of claim 1, wherein said porous medium is electrically conducting, semiconducting or insulating.

8. The method of claim 1, wherein said porous medium comprises graphite foam, mesoporous silica, porous alumina, an aerogel or a xerogel.

9. The method of claim 1, wherein said porous medium comprises a porous polymeric resin, plastic, or rubber.

10. The method of claim 1, wherein said porous medium comprises a porous metal or metal alloy.

11. The method of claim 1, wherein said step of removing is carried out under a non-oxidizing atmosphere comprising nitrogen or a noble gas.

12. The method of claim 1, wherein said removing step is carried out under a pressure lower than 1 atmosphere.

13. The method of claim 1, wherein said liquid further comprises an organic solvent.

14. The method of claim 1, further comprising repeating said steps of contacting and removing until a desired loading level of said nanoparticles on said medium is achieved.

15. The method of claim 1, wherein said providing step comprises providing said ionic liquid and preparing the suspension by physical vapor deposition of nanoparticles in the ionic liquid.

* * * * *